(12) United States Patent
Pollklas

(10) Patent No.: US 9,288,941 B2
(45) Date of Patent: Mar. 22, 2016

(54) AGRICULTURAL HARVESTING MACHINE WITH DEVICE FOR MAINTAINING A COMMINUTION ASSEMBLY

(71) Applicant: CLAAS SELBSTFAHRENDE ERNTEMASCHINEN GMBH, Harsewinkel (DE)

(72) Inventor: Manfred Pollklas, Rheda-Wiedenbrueck (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 149 days.

(21) Appl. No.: 14/174,033

(22) Filed: Feb. 6, 2014

(65) Prior Publication Data
US 2014/0215985 A1 Aug. 7, 2014

(30) Foreign Application Priority Data
Feb. 7, 2013 (DE) .......................... 10 2013 101 183

(51) Int. Cl.
| A01D 41/14 | (2006.01) |
| A01D 41/127 | (2006.01) |
| A01D 46/08 | (2006.01) |
| A01D 43/08 | (2006.01) |
| A01F 29/14 | (2006.01) |

(52) U.S. Cl.
CPC .............. A01D 43/08 (2013.01); A01D 43/085 (2013.01); A01F 29/14 (2013.01)

(58) Field of Classification Search
CPC ....... A01F 29/22; A01F 29/095; B24B 3/368; B24B 3/55; B26D 7/12; A01D 75/08
USPC .................. 451/419, 434, 421; 241/37, 101.2, 241/101.77, 241; 56/12.1, 10.2 R; 460/112
See application file for complete search history.

(56) References Cited

U.S. PATENT DOCUMENTS

| 2,651,162 | A | * | 9/1953 | Whisler | ............... | A01D 43/088 |
| | | | | | | 171/61 |
| 3,867,808 | A | * | 2/1975 | Kidd | ....................... | A01F 29/01 |
| | | | | | | 56/14.1 |
| 4,799,625 | A | | 1/1989 | Weaver, Jr. et al. | | |
| 4,843,767 | A | * | 7/1989 | Johnson | ................. | A01F 29/22 |
| | | | | | | 241/101.2 |
| 4,934,612 | A | * | 6/1990 | Johnson | ................ | A01F 29/095 |
| | | | | | | 241/101.77 |
| 4,991,476 | A | * | 2/1991 | Chow | ..................... | A01F 29/22 |
| | | | | | | 241/101.2 |
| 5,098,027 | A | * | 3/1992 | McClure | ................. | B24B 3/368 |
| | | | | | | 241/101.2 |
| 5,209,025 | A | * | 5/1993 | Martin | .................... | A01F 29/22 |
| | | | | | | 451/193 |
| 5,743,073 | A | * | 4/1998 | Paquet | .................... | A01F 29/22 |
| | | | | | | 241/101.2 |
| 6,430,909 | B1 | * | 8/2002 | Clauss | .................... | A01F 29/22 |
| | | | | | | 56/1 |
| 6,450,866 | B1 | * | 9/2002 | Nieschulze | ............ | A01F 29/22 |
| | | | | | | 451/65 |
| 2001/0034187 | A1 | * | 10/2001 | Wolf | ...................... | A01D 75/08 |
| | | | | | | 451/21 |

(Continued)

FOREIGN PATENT DOCUMENTS

| DE | 41 28 483 | 3/1993 |
| EP | 0 291 216 | 11/1988 |

Primary Examiner — Árpád Fábián-Kovács
(74) Attorney, Agent, or Firm — Michael J. Striker

(57) ABSTRACT

An agricultural harvesting machine embodying a forage harvester includes a comminution assembly with a drum equipped with a plurality of knives. The drum is set into rotation opposite a stationary shear bar in order to comminute crop fed in a region of a cutting gap formed by knives and the shear bar during the harvesting operation. A device controls a rotational speed (n) of the drum at least during a maintenance procedure of the comminution assembly, depending on a property of the drum.

10 Claims, 2 Drawing Sheets

(56) References Cited

U.S. PATENT DOCUMENTS

| | | | |
|---|---|---|---|
| 2002/0009963 A1* | 1/2002 | Clauss | A01F 29/22 451/419 |
| 2002/0009964 A1* | 1/2002 | Wolf | A01F 29/22 451/419 |
| 2005/0124263 A1* | 6/2005 | Clauss | A01F 29/22 451/5 |
| 2007/0010305 A1* | 1/2007 | Vogelgesang | A01D 43/085 460/112 |
| 2007/0271893 A1* | 11/2007 | Pollklas | A01F 29/22 56/12.1 |
| 2010/0126258 A1* | 5/2010 | Beck | B24B 3/363 73/104 |
| 2012/0067037 A1* | 3/2012 | Bohrer | A01D 75/187 60/450 |
| 2012/0267458 A1* | 10/2012 | White | A24B 7/12 241/25 |
| 2013/0042591 A1* | 2/2013 | Behnke | A01F 29/095 56/10.2 A |

\* cited by examiner

AGRICULTURAL HARVESTING MACHINE WITH DEVICE FOR MAINTAINING A COMMINUTION ASSEMBLY

CROSS-REFERENCE TO A RELATED APPLICATION

The invention described and claimed hereinbelow is also described in German Priority Document DE 10 2013 101183.7, filed on Feb. 7, 2013. The German Priority Document, the subject matter of which is incorporated herein by reference, provides the basis for a claim of priority of invention under 35 U.S.C. 119(a)-(d).

BACKGROUND OF THE INVENTION

The invention relates to an agricultural harvesting machine (e.g., a forage harvester) configured with a comminution assembly having a drum equipped with a plurality of knives that is set into rotation opposite a stationary shear bar in order to comminute crop fed in the region of a cutting gap formed by knives and shear bar during the harvesting operation, and more particularly relates to such a machine that includes a device for controlling the rotational speed (n) of the drum at least during a maintenance procedure of the comminution assembly depending on a property of the drum.

During operation of an agricultural harvesting machine, such as a forage harvester in particular, various maintenance actions must be repeatedly performed on the chopping assembly within the scope of the harvesting operation in order to maintain the quality of the chopping process. The reason therefor is that the cutting process to which the incoming crop is continuously subjected induces wear on the chopping knives and on the shear bar of the chopping assembly. If chopping is performed using blunt knives and/or with a shear bar that is imprecisely adjusted, for whatever reason, this in turn results in reduced chopping quality and increased energy consumption for driving the chopping assembly.

It is therefore necessary to perform maintenance actions on the chopping assembly comprising in particular sharpening the knives and/or precisely adjusting the shear bar in order to obtain a suitable cutting gap.

According to conventional methods, both of the aforementioned maintenance procedures are performed while the chopper drum is running. In order to perform sharpening, a sharpening stone is moved parallel to the rotational axis of the (rotating) chopper drum along the chopping knives using a sharpening carriage, and is thereby radially preloaded against the chopping knives in order to apply a sharpening force to the knives. Reference is made in this context to DE 41 28 483 A1, for example.

In order to obtain different lengths of cut, for use with different crop types and/or for other reasons, it is common to equip the chopper drum with different numbers of knives or to use different types of chopper drums having different numbers of knife receptacles (and, therefore, different numbers of knives). In respect of sharpening processes to be carried out, as the distance between successive knives increases, whether due to the design of the chopper drum and/or due to the knife-installation state, the risk also increases that the sharpening stone, which is radially preloaded against the chopper drum, will abruptly drop into the intermediate spaces (gaps) between the knives. This abrupt drop induces strong oscillations, which are expressed as loud, audible, unpleasant noises and also result in premature wear at least of the knives and the sharpening device.

In addition, in order to maintain good chopping quality and prevent increased fuel consumption, the distance between the shear bar and the rotating chopper drum must always be set exactly. This is performed in a manner known per se, for which reference is made to EP 0 291 216 A, for example, within the framework of an adjustment procedure by incrementally moving the shear bar, one side at a time, toward the rotating chopper drum, until knock sensors mounted on the shear bar detect contact by the shear bar with the knives moving past. Due to the sensor system used in this adjustment process and due to other ambient conditions, the knock-sensor signals to be evaluated contain a large noise component. In particular, when chopper drums are equipped with different numbers of knives and/or when different types of cutting cylinders are used, it is difficult for evaluation electronics that are used to detect individual knives from among low-voltage, noisy signals. Noise-induced voltage swings can therefore be easily misinterpreted by being allocated to a knife that is not even present. This problem intensifies in practical applications since an increasing bandwidth of drums and numbers of knives is used and the knock sensors must therefore detect knocking that is triggered with very different timing.

SUMMARY OF THE INVENTION

The present invention overcomes the shortcomings of known arts, such as those mentioned above.

To that end, the present invention provides an agricultural harvesting machine of the aforementioned type, in which maintenance processes to be carried out on the running chopper drum is better implemented and, for various configurations of the chopping assembly.

In an embodiment, the invention provides agricultural harvesting machine (e.g., a forage harvester) configured with a comminution assembly having a drum equipped with a plurality of knives that is set into rotation opposite a stationary shear bar in order to comminute crop fed in the region of a cutting gap formed by knives and shear bar during the harvesting operation, characterized by a device for controlling the rotational speed of the drum, depending on the property of the drum, at least during maintenance of the comminution assembly.

The rotational speed of the drum is therefore influenced by a control device, at least during the maintenance procedure, thereby making it possible to implement the maintenance procedure in a suitable manner with consideration for the properties of the particular drum that is used. Influencing the rotational speed results in advantages for various maintenance procedures.

Basically, a property of the drum can be any parameter that influences the maintenance procedure. Advantageously, the property of the drum is the knife-installation state thereof, i.e. the number of knives disposed on the drum, in particular. Furthermore, the knife-installation state can include additional information, such as how the knives are installed (arrangement of the knives in a plurality of rows, spacing of the knives, installation angle of the knives, knife type, etc.). A property of the drum also can be the design thereof, in general.

According to an embodiment, a property of the drum can be the natural frequencies thereof. The advantage of accounting for the natural frequencies of the drum is that the drum rotational speed can be set in gaps between the natural frequencies during the maintenance procedure, thereby substantially reducing disadvantageous vibrations resulting from natural oscillations.

According to an embodiment, during the maintenance procedure, a drum having a greater separation between successive knives is set into rotation at a higher rotational speed than is the case for a drum having a relatively smaller separation between successive knives. In this manner, an approximately constant knife frequency (the number of knives passing by per unit of time) relative to a stationary tool (sharpening tool, shear bar) is advantageously achieved for different knife-installation states.

The rotational speed control according to the invention is preferably used for maintenance procedures that comprise the actuation of a tool assigned to the drum.

Such a tool can be a sharpening device for the knives of the drum. Advantageously, the rotational speed of the drum is then selected such that contact interruptions between the sharpening stone and the knives, which may result between successive knives due to knife gaps, are so brief that the sharpening stone is prevented from abruptly dropping radially into these knife gaps. This is achieved, in particular, in that a higher rotational speed is selected for a drum equipped with fewer knives than that selected for a drum equipped with a relatively greater number of knives. Due to the rotational speed adaptation that is provided, the sharpening procedure takes place with markedly reduced oscillations, in particular for drums equipped with fewer knives. In addition to reduced oscillations and, therefore, reduced noise, the rotational speed adaptation described also yields an improved sharpening result which is more uniform.

Within the scope of the use of the rotational speed control for a sharpening procedure, it can also be advantageously provided that the rotational speed of the drum selected for the sharpening procedure is also adapted depending on the state of use of the knives. Therefore, a different rotational speed could be utilized during the sharpening of new knives (unused), for example, than during the sharpening of knives that have already been worn down. Since worn knives are typically shorter than new knives, a drum equipped with worn knives has longer knife gaps. Therefore, such a drum could be advantageously sharpened at a higher rotational speed in order to thereby compensate for the longer knife gaps and prevent the disadvantageous radial abrupt dropping of the sharpening stone.

As an alternative or in addition thereto, the tool can be a device for adjusting the distance of the shear bar from the drum. Such shear bar adjustment devices are typically based on the technique of slowly and incrementally moving the shear bar toward the rotating drum until oscillation sensors (so-called "knock sensors") detect contact by the knives with the shear bar. Since the measurement signals of the knock sensors are usually subject to strong noise, the evaluation of the signals, which is required for the adjustment process, is made difficult. If different drums and/or drums that are equipped with knives in different manners are used, it becomes even more difficult to match the measurement signals to knife contacts that have occurred. In order to simplify the signal evaluation, it is therefore advantageous to select the rotational speed of the drum during the procedure for adjusting the shear bar such that the knock frequency that can be detected at the shear bar is approximately identical for different knife-installation states and/or drum types. Thus, the drum rotates twice as rapidly when equipped with half as many knives as compared to the total number of knives in order to ensure that the knock sensors detect the same impact frequency in each case. The evaluation of the signals can then also be carried out for different knife-installation states of drums, in the same manner in each case, and in particular using the same data evaluation program.

In an embodiment, the harvesting machine comprises a device that is operated to determine the number of knives installed on the drum on the basis of a knock frequency induced by knives, at a known rotational speed of the drum, in order to make these knives available for a maintenance procedure as described above. Advantageously, it is possible to determine the number of knives present on the drum in a mechanical manner. In this case, there is no need for an operator to manually enter the number of knives (as an alternative).

BRIEF DESCRIPTION OF THE DRAWINGS

Further features and advantages of the invention will become apparent from the description of embodiments that follows, with reference to the attached figures, wherein.

DETAILED DESCRIPTION OF THE INVENTION

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Figure 1:
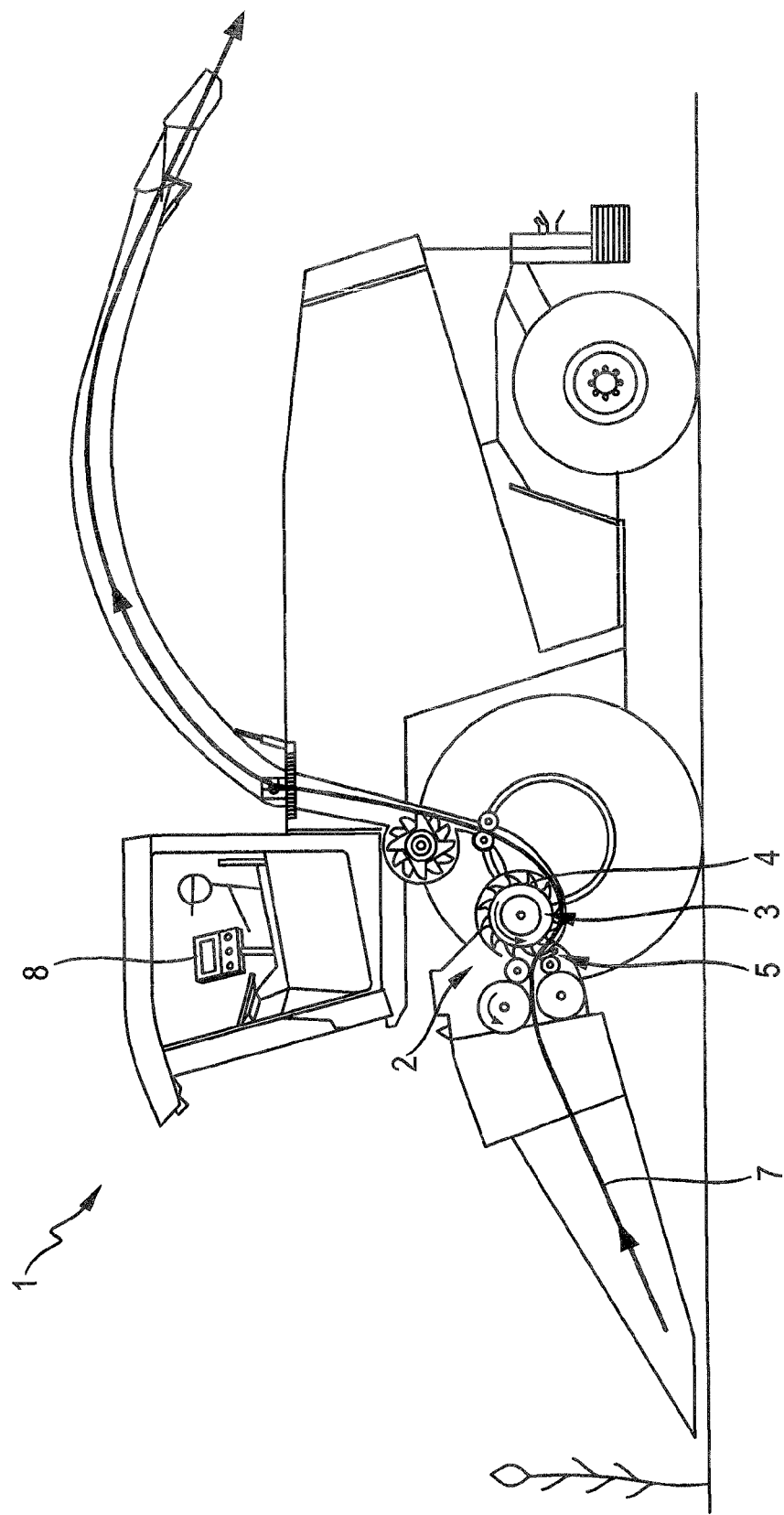
FIG. 1 presents a schematic side view of a self-propelled forage harvester equipped with a chopping assembly constructed to operate according to the inventive principles.

FIG. 1 shows an agricultural harvesting machine in the form of a self-propelled forage harvester 1. The forage harvester 1 has typical features of a forage harvester, which are known per se and are therefore not explained in detail herein. During the harvesting operation, the forage harvester 1 is used to comminute ("chop") picked-up crop 7, which is fed to a chopping assembly 2 in the form of a compressed crop stream. The comminuted crop is ejected out of the forage harvester 1 onto a (non-illustrated) hauling vehicle. The path taken by the crop 4 through the forage harvester 1 is shown in FIG. 1 by a line having arrows thereon.

The chopping assembly 2 comprises a chopper drum 3, which is equipped around the circumference thereof with a plurality of knives 4. The chopper drum 3 is driven in the rotational direction indicated by the arrow (in the counterclockwise direction according to the view shown in FIG. 1). A drive train formed by a drive engine and a transmission (e.g., a belt drive) connected therebetween is used for driving. The drive train advantageously comprises at least one clutch. The transmission can have fixed and/or variable-speed transmission ratios. The chopping assembly 2 also comprises a shear bar 5, which is mounted in a stationary manner opposite the rotating chopper drum 3. The shear bar 5 and the chopper drum 3 (in particular the knives 4 thereof) together form a cutting gap 6 (shown in detail in FIG. 2), at which the crop 4 fed to the chopping assembly 2 during the harvesting operation is chopped into particles having the desired length of cut.

The forage harvester 1 also comprises a control, operating and display device 8 disposed in a driver's cab of the forage harvester 1 for operator accessibility. According to the invention, the control, operating and display device 8 of the forage harvester 1 is used to control the rotational speed n of the chopper drum 3 at least during a maintenance procedure of the chopping assembly 2 in a manner dependent upon a property of the chopper drum 3, as explained in greater detail by reference to FIG. 2. To this end, the control, operating and display device 8 has a signal connection to an actuator that influences the rotational speed n of the chopper drum 3. This can be the drive motor and/or a transmission element of the forage harvester 1.

Figure 2:
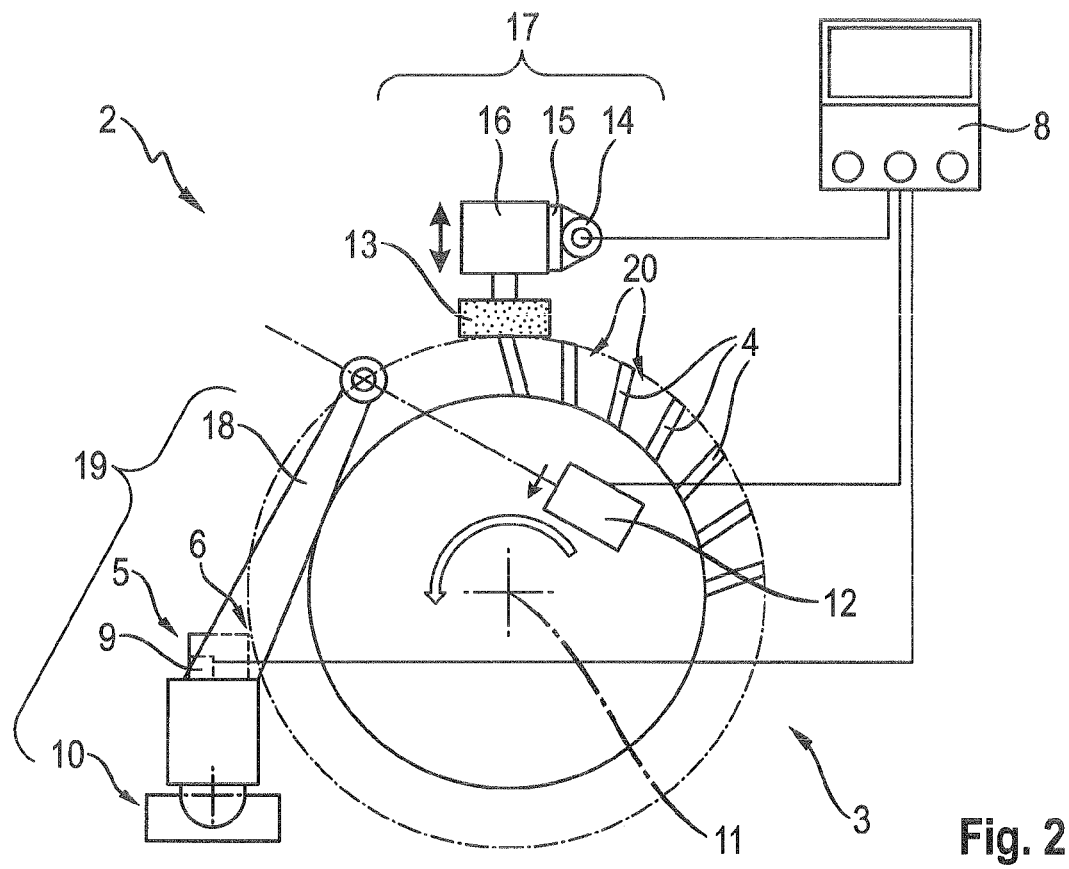
FIG. 2 presents a schematic side view the chopping assembly including that the chopper drum of which is equipped with a first number of knives.

FIG. 2 presents a schematic depiction of the FIG. 1 chopping assembly 2 in greater detail. The chopping assembly 2 is installed in a forage harvester 1, according to FIG. 1. The chopper drum 3 and the shear bar 5 shall be referenced first as elements that are essential for the harvesting operation. The chopper drum 3 is equipped with a plurality of knives 4, which are distributed around the circumference with equidistant spacing between one another (for purposes of clarity, only a portion of the installed knives is shown). The knives 4 are detachably fastened on the chopper drum 3, thereby permitting these knives to be uninstalled in the event of wear and, in particular, to permit modification of the chopper drum 3.

Figure 3:
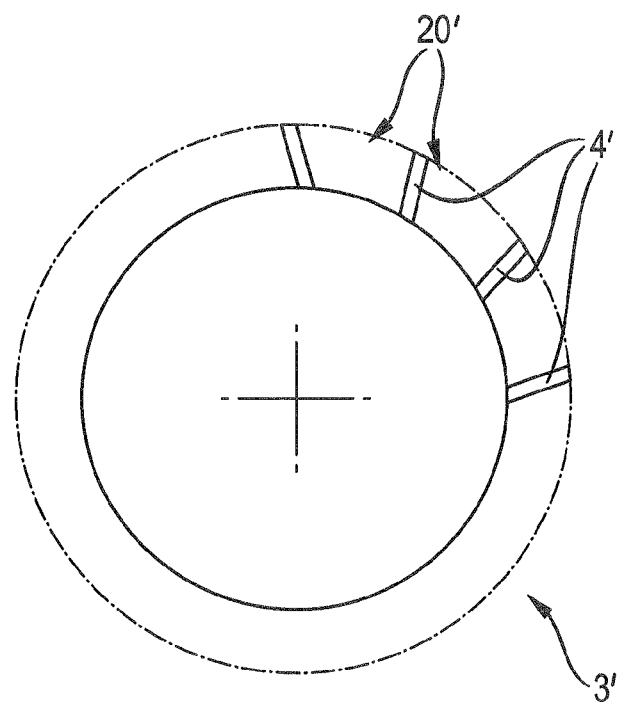
FIG. 3 presents a view of a chopper drum equipped with a second number of knives.

FIG. 3 shows a chopper drum 3', which is equipped with fewer (half as many) knives 4' as compared chopper drum 3 shown in FIG. 2, in order to obtain longer lengths of cut, for example. Apart from the different knife-installation states, the chopper drum 3' according to is the same as the chopper drum 3 according to FIG. 2. A plurality, preferably two, rows of knives 4, 4' are disposed next to one another (relative to the rotational axis 11) on the chopper drums 3, 3'. In addition, the knives 4, 4' are disposed so as to be rotated relative to the rotational axis of the chopper drum 3, 3' by a small angle (as shown) in order to achieve a more uniform drive load of the chopper drum 3, 3'.

In order to ensure an efficient comminution procedure, it is essential that maintenance procedures be carried out on the chopping assembly 2 at certain intervals. These maintenance procedures include sharpening the knives 4 and adjusting the shear bar 5 to a precise position of separation from the chopper drum 3.

The chopping assembly 2 comprises a sharpening device 17 for this purpose. This comprises a sharpening stone 13, which is moved on the enclosing circle of the chopping knives 4. The sharpening stone 13 is fastened on a carriage 16, which is displaced along a rail 15 parallel to the rotational axis 11 of the chopper drum 3 by means of an adjusting cylinder unit 14. The sharpening stone 13 is moved back and forth along the entire effective width of the chopper drum 3 while the chopper drum 3 is rotating, in order to sharpen the knives 4 along the entire length thereof, in particular to set an edge thereon. In order to apply the frictional force required to sharpen the knives 4, the sharpening stone 13 is preloaded radially relative to the chopper drum 3 and therefore can be moved radially within certain limits (see the double arrow pointing upward and downward in FIG. 2).

FIG. 2 further highlights that the gaps 20 between successive knives 4 are sufficiently small as to prevent the sharpening stone 13 from penetrating these despite the radial preload thereof (in the direction of the rotational axis 11). The sharpening stone 13 therefore has virtually constant contact with at least one knife 4.

If the chopper drum 3' is then equipped with fewer (in that case: half as many) knives 4', however (as depicted in the FIG. 3 embodiment) the risk arises in the sharpening procedure that the sharpening stone 13 will abruptly drop into the knife gaps 20' during the sharpening procedure, since these knife gaps are markedly larger (in the circumferential direction) than the knife gaps 20 of the drum 3. Even if the radial mobility of the sharpening stone 13 is limited, considerable oscillations are produced by the abrupt drop and subsequent impact of the knives 4' against the sharpening stone 13, said oscillations resulting in noise and increased wear.

In order to prevent these disadvantages, the control device 8 ensures that, during the sharpening procedure, the rotational speed n of the drum 3 or 3' is selected depending on the particular knife-installation state of the drum 3, 3' such that contact interruptions between the sharpening stone 13 and the knives 4, 4', which may result due to knife gaps 20, 20', are so brief that the sharpening stone 13 is prevented from abruptly dropping radially into these knife gaps 20, 20'. In other words, the control device 8 specifies a drum rotational speed n depending on the knife-installation state at which said drum rotational speed the sharpening stone 13 (which can move only with a certain inertia), is incapable of abruptly dropping into the knife gaps 20, 20'. To this end, the control device 8 has a signal connection to an actuator (drive engine, transmission actuator, or the like) that influences the rotational speed of the drum 3' in order to set a suitable rotational speed n of the drum 3, 3'. In this manner as well, the sharpening procedure is implemented in a quiet manner even when few knives are installed on the drum 3'.

The chopping assembly 2 also comprises a shear bar adjustment device 19. By use of the shear bar adjustment device 19, a cutting gap 6 formed between the knives 4 of the chopper drum 3 and the shear bar 5 is precisely set. To this end, the shear bar 5 is supported, in a manner known per se, so as to be swivellable relative to a bearing 10 fixed to the machine frame. Two redundantly designed knock sensors 9 are assigned to the shear bar 5, which are used to detect oscillations, e.g., knock noises caused by the knives 4 impacting the shear bar 5. Using levers 18 disposed on either side of the shear bar 5, the shear bar 5 is movable relative to the chopper drum 3 by a servomotor 12 that is connected to the upper end of one of the levers 18 via a spindle drive, in order to thereby influence the cutting gap 6.

Since the measurement signals of the knock sensors 9 are subject to strong noise due to the physical circumstances, a difficulty occurs in the signal evaluation required for the adjustment procedure in terms of unambiguously assigning voltage swings of the knock sensors 9 to a knife contact. That is, it is possible for a noise-induced voltage swing to be mistakenly allocated to a knife contact (which did not occur at all). In this case, an incorrect (e.g. spaced too far away) adjustment of the shear bar 5 could result. Such a potentially incorrect adjustment would have markedly disadvantageous effects on the efficiency of the chopping process. The risk of such erroneous allocations increases considerably when drums 3 having different knife-installation states are used.

In order to prevent this disadvantage, the control device 8 ensures that, during the procedure for adjusting the shear bar, the rotational speed n of the drums 3 is selected depending on the particular knife-installation state of the drums 3. Consequently, the knock frequency that can be detected at the shear bar 5 is approximately identical for different knife-installation states (and/or different drum types). It is therefore ensured that the knock sensors are each exposed to a knock frequency that is comparable in respect of time and, in fact, independently of the number of knives 4 installed on the drum 3. The signal evaluation can therefore always be carried out by an algorithm that is triggered at the same time, thereby yielding more reliable results. The shear bar 5 can therefore be adjusted in a more exact and reliable manner.

In a simple case, in order to specify to the control device 8 the number of knives 4 installed on the drum 3, which is used as the basis for control, a machine operator can manually enter the number of knives and/or other drum properties (drum type). Advantageously, the invention also provides that the knife-installation state is automatically determined. To this end, the drum 3 is initially driven at a known rotational speed n, for example, wherein the control device 8 determines the number of knives 4 on the drum 3 on the basis of the knock frequency detected by the knock sensors 9. Once the number of knives is determined in this manner, a sharpening procedure and/or a shear bar adjustment procedure (as described above) is carried out with consideration for the number of knives that was determined and the rotational speed of the drum, which is controlled depending on the number of knives.

LIST OF REFERENCE CHARACTERS

1 forage harvester
2 chopping assembly
3 chopper drum
4 knife
5 shear bar
6 cutting gap
7 crop
8 control-, operating-, and display device
9 knock sensor
10 bearing
11 rotational axis
12 servomotor
13 sharpening stone
14 adjusting cylinder unit
15 rail
16 carriage
17 sharpening device
18 lever
19 shear bar adjustment device
20 knife gap
3' chopper drum
4' knife
20' knife gap
n drum rotational speed As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. An agricultural harvesting machine configured with a comminution assembly, the comminution assembly comprising:
   a drum equipped with a plurality of knives;
   a stationary shear bar;
   a device for automatically controlling a rotational speed (n) of the drum;
   wherein the device sets the drum into rotation opposite the stationary shear bar to comminute crop fed in the region of a cutting gap formed by knives and shear bar during the harvesting operation;
   wherein the device automatically determines a property of the drum and based on the automatically determined property of the drum, the device automatically controls the rotational speed (n) of the drum during a maintenance procedure of the comminution assembly; and
   wherein the determined property of the drum is any of the group consisting of a number of the plurality knives of which the drum is equipped, a design or type of the drum and a separation between successive knives of the plurality of knives.

2. The agricultural harvesting machine according to claim 1, wherein, during the maintenance procedure, a drum having a greater separation between successive knives of the plurality of knives is set into rotation at a higher rotational speed (n) than a rotational speed than a drum having a smaller separation between successive knives of the plurality of knives.

3. The agricultural harvesting machine according to claim 1, wherein the maintenance procedure includes the actuation of a tool assigned to the drum.

4. The agricultural harvesting machine according to claim 3, wherein the tool is a sharpening device for the knives of the drum.

5. The agricultural harvesting machine according to claim 4, wherein the sharpening device includes a sharpening stone, wherein the property is the separation between successive knives of the plurality of knives and wherein the rotational speed (n) of the drum is controlled such that contact interruptions between the sharpening stone and the knives that result between successive knives due to separation between the successive knives do not allow for the sharpening stone to abruptly drop radially into any of the separations between the successive knives.

6. The agricultural harvesting machine according to claim 4, wherein the rotational speed (n) of the drum is automatically controlled by the device based on a detected wear of one or more of the plurality of knives.

7. The agricultural harvesting machine according to claim 3, wherein the tool is a shear bar adjustment device for adjusting the separation between the shear bar and the drum.

8. The agricultural harvesting machine according to claim 7, wherein the rotational speed (n) of the drum is selected such that the knock frequency detectable at the shear bar is approximately identical for different knife-installation states, drum types or both.

9. The agricultural harvesting machine according to claim 1, wherein the determined property is the number of the plurality of knives of which the drum is equipped and wherein the device for controlling the rotational speed (n) of the drum determines the number of knives based on a detected knock frequency caused by the knives at a known rotational speed (n) of the drum in order to make the knives available for a maintenance procedure.

10. The agricultural harvesting machine according to claim 1, embodying a forest harvester.

* * * * *